Patented June 2, 1942

2,284,685

UNITED STATES PATENT OFFICE

2,284,685

PREPARATION OF PHTHALOCYANINE PIGMENTS

Stanley Rawlings Detrick, Wilmington, Del., and Robert Titus Diver, Penns Grove, N. J., assignors to E. I. du Pont de Nemours & Company, Wilmington, Del., a corporation of Delaware No Drawing. Application October 25, 1939, Serial No. 301,171

4 Claims. (Cl. 260—314)

This invention relates to the preparation of phthalocyanine pigments of improved properties.

This invention has as its object the preparation of phthalocyanine pigments of superior properties as compared with the pigments obtained by the processes of the prior art. A more specific object is the preparation of the phthalocyanine pigments of improved tinctorial strength, brilliance and purity as compared with pigments obtained by the methods previously disclosed. A more particular object is the preparation of copper phthalocyanine of improved brilliance and tinctorial strength. Still another object is the development of processes readily operable on a manufacturing scale for the attainment of the improvements stated above.

It has been known in the art that phthalocyanines can be dissolved in strong sulfuric acid or equivalent solvents and that by drowning such solutions in water the phthalocyanine is reprecipitated. This drowning is in such a volume of water that the final acid strength is not over 20%. This method has been employed in the art for the purification of phthalocyanine pigments, and is generally referred to in plant practice as "acid pasting."

We have now found that a pigment of much greater purity, as expressed by superior tinctorial strength and brilliance, is obtained if the crude pigment to be purified is treated with sulfuric acid of less strength than that required for complete solution, but of sufficient strength to form a sulfate of the phthalocyanine compound, that is, an addition compound of sulfuric acid upon one or more of the basic N-atoms in the molecule. This sulfate is then separated from the residual sulfuric acid mass, for instance by filtration and washing, and is then treated further to decompose the sulfate, liberating the free pigment.

The last step may be accomplished in one of two ways: (1) By redissolving the crystallized sulfate in sulfuric acid of proper strength, then drowning the sulfuric acid solution in a sufficient quantity of water, so that the pigment is separated as the free phthalocyanine rather than the sulfate. (2) By treating the sulfate with water and/or alkalis at a sufficient dilution, so that the phthalocyanine sulfate is converted to the free phthalocyanine pigment. In either event, the pigment, after treatment as above, is filtered off and may be washed and finished by any of the various processes of the art to produce pastes, or water-dispersible or oil-dispersible powders.

This invention will be understood more completely by reference to the following examples but is not to be limited thereby. All quantities are stated in parts by weight.

Example 1

One hundred parts of copper phthalocyanine prepared from phthalonitrile and cuprous chloride as described in Ex. 3 of British Patent No. 410,814 and ground to pass through a 40-mesh sieve are dissolved in 1000 parts of 98 to 100% sulfuric acid. 110 parts of water are then added slowly, maintaining the temperature below 10° C. Long needles of copper phthalocyanine sulfate crystallize from the solution. The copper phthalocyanine sulfate is then recovered by filtration, and the nutsch cake is washed with 500 parts of 80% sulfuric acid. Most of the impurities in the crude pigment are carried away in the acid filtrate and the washings.

The nutsch cake is now redissolved in 750 parts of sulfuric acid monohydrate and the acid solution is drowned in 7500 parts of water at 95 to 100° C. The pigment is filtered off, washed acid free to litmus papers, and dried in a suitable oven at 50 to 60° C. When ground into linseed oil varnish on a three-roll ink mill and compared with a control sample (prepared by acid pasting without intermediate sulfate formation), the recrystallized pigment is more jet in masstone, redder, brighter and stronger.

Example 2

Fifty parts of copper phthalocyanine, prepared as described in Ex. 5 of British Patent No. 464,126, are dissolved in 500 parts of 98% sulfuric acid at 20 to 30° C. 210 parts of 80% sulfuric acid are added slowly, maintaining the temperature below 30° C. The charge is allowed to remain without agitation and is cooled to 5 to 10° C. At the end of this time, the charge has crystallized into large blue-green plates of copper phthalocyanine sulfate. Another 90 parts of 80% sulfuric acid is then added, followed by 90 parts of water. The mass is now filtered and washed with 500 parts of 50% sulfuric acid.

The nutsch cake is returned to sulfuric acid monohydrate and finished to dry pigment as described in Ex. 1. When ground in linseed oil varnish and compared with a control sample, it is found more milky in masstone, slightly redder, brighter and stronger.

*Example 3*

This example was similar to Ex. 2, except that nickel phthalocyanine was substituted for copper phthalocyanine. When ground in linseed oil varnish and compared with a control sample, the product was jet in masstone, brighter and stronger than the control sample.

*Example 4*

Fifty parts of copper phthalocyanine were added to 500 parts of 65 to 70% sulfuric acid. The charge was agitated until it became a thick viscous mass of copper phthalocyanine sulfate crystals. The charge was filtered and the nutsch cake was washed with 60% sulfuric acid. The nutsch cake was then returned to solution in 750 parts of sulfuric acid monohydrate, and drowned in 7500 parts of water at 95 to 100° C. From this point on, the product was finished to a dry pigment as described in Ex. 1. When ground in linseed oil and compared with a control sample (see Ex. 1), it was milky in masstone, redder, brighter and stronger.

*Example 5*

One hundred parts of copper phthalocyanine crude was added to 1500 parts of 80% sulfuric acid. The mixture was placed in a ball mill and agitated for 12 hours. The highly viscous mass was then removed from the mill and drowned in 15,000 parts of water at 95 to 100° C. The charge was finished to dry pigment as described in Ex. 1. When ground in oil and compared with a control, the product was milky in masstone, slightly greener and slightly brighter and equal in strength to the control.

*Example 6*

This example was similar to Ex. 5, except that aluminum phthalocyanine was used instead of copper phthalocyanine. The product was slightly milky in masstone, slightly greener and equal in brilliance and close in strength to a control sample.

*Example 7*

The conditions of Ex. 5 were repeated with the exception that the copper phthalocyanine sulfate was removed by filtration and washed with 500 parts of 50% sulfuric acid. The nutsch cake was drowned in 1000 parts of water at 95 to 100° C. The product was finished to dry pigment as described in Ex. 1. The product, when ground in oil and compared with a standard sample, was slightly jet in masstone, slightly greener, slightly brighter and close in strength.

This invention is applicable to the purification of metal-free phthalocyanine or of any metallic phthalocyanine which is stable in concentrated sulfuric acid (that is, does not lose its central metal upon being treated with concentrated sulfuric acid), for instance copper, nickel, iron, cobalt, chromium or aluminum phthalocyanine. Apart from this limitation, however, the method is general and may be applied to phthalocyanine compounds whether prepared from phthalonitrile or from phthalic anhydride or by any other of the methods known to the art. Also, the phthalocyanine may or may not contain nuclear substituents, for instance halogen.

The conditions of operation may be varied within wide limits, and are not confined to the details given in the above examples. Thus the ratio of acid to pigment in the step of forming the sulfate may vary widely for instance between 6:1 and 15 or 20:1, depending on the strength of acid selected. The stronger the acid and the greater its quantity, the greater the speed of conversion into sulfate. On the other hand the concentration of the acid should not be so great as to dissolve the pigment.

The limits of acid concentration to prevent solution of the pigment on the one hand and decomposition of the sulfate on the other hand can best be determined by experiment for each particular case. The sulfate of any given phthalocyanine color can be readily distinguished from the free color by its crystalline structure when observed under the microscope. In the case of copper-phthalocyanine, the aforementioned limits of concentration are 90% and 40%, respectively. In the case of other colors of this series, the limits will be somewhere in the neighborhood of these figures. It is therefore safe to treat the color in any event with sulfuric acid of between 50 and 90% concentration. In the final dilution step the concentration may, as a general rule, be brought down to between 10 and 20%.

The temperature of the sulfate treatment should preferably be low, say 0° to 30° C., with the optimum for crystallization at about 5 to 10° C.

As already stated the conversion of the sulfate into free color may be brought about either by direct dilution with water (which process is, however, slow) or by dissolving the sulfate in concentrated sulfuric acid and then drowning in water. In the latter event, the concentration of the acid for solution may be anything above 90° C., preferably 98 to 100° C. Oleum or chlorosulfonic acid may be employed, but the temperature then must be kept low (say 0° to 5° C.) to avoid sulfonation. In the case of direct dilution, small amounts of sodium hydroxide or other alkali may be added to aid in splitting off the sulfate. The temperatures and volumes at which the conversions of the sulfates to the free phthalocyanines are carried out are generally governed by the physical properties desired in the finished pigments.

The mechanism of sulfate formation in the case of a phthalocyanine color may be explained by observing that the phthalocyanine complex contain several tertiary nitrogen atoms. These act like tertiary bases and add on a sulfuric acid molecule to form an ammonium salt: In the presence of alkali or even merely a large quantity of water, this sulfate decomposes splitting off sulfuric acid and liberating the free base.

By the improved processes of the invention the phthalocyanines are obtained in higher purity and therefore of improved brilliance and tinctorial value as compared with the products of the prior art. Further the present invention makes possible improved methods of dispersing the pigments, whereby better control of the particle size may be effected. Likewise the present invention produces a means of removing most and usually all of the impurities from the crude pigments, such impurities being dissolved in the mother liquors from the sulfate crystallizations. The presence of such impurities in many cases affect adversely not only the shade, brilliance and tinctorial properties of the pigments but also their physical properties, particularly texture.

The phthalocyanine pigments are used extensively in printing inks, coating compositions, paints, lacquers, enamels, and for paper dyeing and coating. Products of enhanced value are obtained according to the present invention.

In the claims below, the expression "N-sulfate" is to be understood as referring to an addition compound of sulfuric acid on some of the tertiary nitrogen atoms of the phthalocyanine molecule, as distinguished from a metal sulfate formed by the third valency of the metal in the case of a phthalocyanine of a trivalent metal.

We claim:

1. A process of purifying a phthalocyanine compound selected from the group consisting of metal-free phthalocyanine and those metal-phthalocyanines which do not lose their central metal upon being treated with concentrated sulfuric acid, which comprises converting the said phthalocyanine compound into an N-sulfate thereof, isolating the latter in crystalline form, then dissolving the same in concentrated sulfuric acid, and diluting the solution to a large volume to precipitate the free phthalocyanine compound.

2. A process of producing copper phthalocyanine in a state of high purity and improved physical form which comprises treating the same with concentrated sulfuric acid of less than 90% strength whereby to form a sulfate thereof, recovering the sulfate in crystalline form, and then dissolving the same in concentrated sulfuric acid followed by drowning in a large mass of water, whereby to reconvert the sulfate into free copper phthalocyanine.

3. A process of producing a phthalocyanine dyestuff in a state of high purity and improved physical form, said phthalocyanine dyestuff being selected from the group consisting of metal-free phthalocyanine and those metal phthalocyanines which do not lose their central metal when treated with concentrated sulfuric acid, which comprises converting the dyestuff into an N-sulfate thereof, isolating the latter in crystalline form, then dissolving the same in concentrated sulfuric acid and drowning the solution in a large volume of water at an initial temperature of 95 to 100 C., to precipitate the free phthalocyanine compound.

4. A process of purifying copper phthalocyanine, which comprises treating the same with concentrated sulfuric acid of less than 90% strength whereby to form a sulfate thereof, recovering the sulfate in crystalline form, and then dissolving the same in concentrated sulfuric acid followed by drowning in a large mass of water at an initial temperature of 95 to 100° C., whereby to reconvert the sulfate into free copper phthalocyanine.

STANLEY RAWLINGS DETRICK.
ROBERT TITUS DIVER.

CERTIFICATE OF CORRECTION.

Patent No. 2,284,685. June 2, 1942.

STANLEY RAWLINGS DETRICK, ET AL.

It is hereby certified that error appears in the printed specification of the above numbered patent requiring correction as follows: Page 2, second column, line 21, for "90%" read --80%--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.